Dec. 23, 1930.  G. SUNDBACK  1,785,920
SEPARABLE FASTENER
Original Filed Feb. 14, 1925
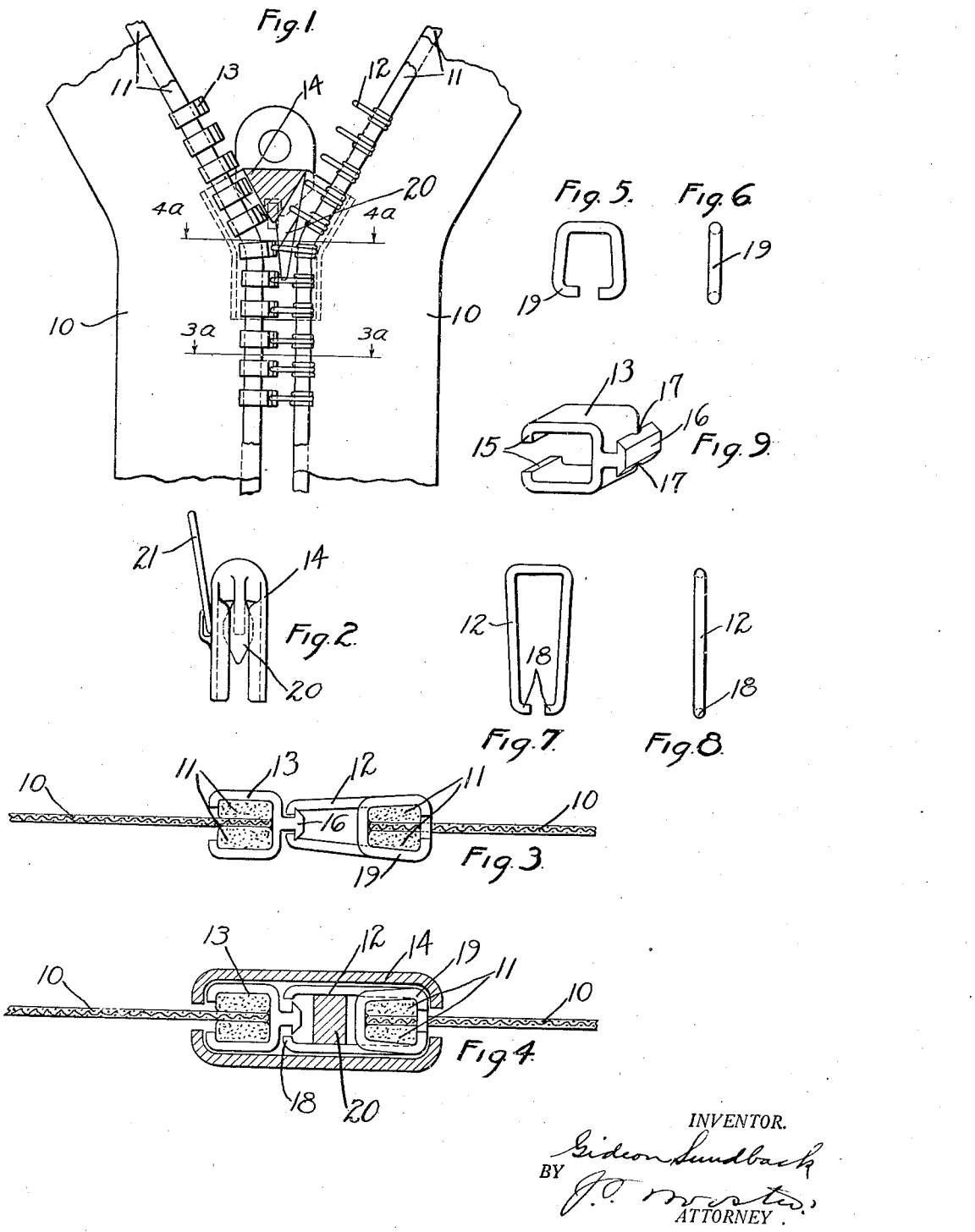

Patented Dec. 23, 1930

1,785,920

UNITED STATES PATENT OFFICE

GIDEON SUNDBACK, OF MEADVILLE, PENNSYLVANIA, ASSIGNOR TO HOOKLESS FASTENER COMPANY, OF MEADVILLE, PENNSYLVANIA, A CORPORATION OF PENNSYLVANIA

SEPARABLE FASTENER

Original application filed February 14, 1925, Serial No. 9,087, and in Canada February 6, 1926. Divided and this application filed March 9, 1928. Serial No. 260,493.

This invention relates to separable fasteners of the slider controlled type and is a division of my copending application Serial No. 9,087, filed February 14, 1925.

An object of the invention is to provide a simple and efficient separable fastener which is flexible, yet which will not become accidentally unfastened under tension on the stringers in any direction.

One form of slide type fasteners heretofore proposed comprises resilient locking members arranged to be spread by cam surfaces in the slider to engage or disengage the edge of the opposite stringer. These fasteners are open to the objection of being likely to come unfastened due to the resilient locking members spreading under transverse stress.

The present invention provides a fastener having locking members capable of being deformed by cam surfaces in the slider for cooperation with locking members on the opposite stringer and arranged in such way that the two members cannot be disengaged under tensional stress in any direction. According to a feature of the invention, resilient clip locking members are secured to one stringer and complementary locking members secured to the opposite stringer, the ends of the resilient clips preferably being bent toward each other at substantially right angles so that they may securely engage projecting portions on the opposite locking members and cannot become accidentally separated therefrom.

In the accompanying drawing:

Fig. 1 is a plan view of a separable fastener embodying the invention;

Fig. 2 is a side view of the slider actuating the locking members of Fig. 1;

Fig. 3 is an enlarged section taken on the line 3a—3a of Fig. 1;

Fig. 4 is an enlarged section taken on the line 4a—4a of Fig. 1;

Fig. 5 is an enlarged detail of one of the securing members;

Fig. 6 is a side view of the member shown in Fig. 5;

Fig. 7 is an enlarged plan view of one of the resilient clip locking members;

Fig. 8 is a side view of the member shown in Fig. 7; and

Fig. 9 is an enlarged perspective view of a locking member of the opposite series from that of the member shown in Figs. 7 and 8.

The separable fastener shown in Fig. 1 comprises stringers of flexible tape 10 along the edges of which are sewed the cords 11, providing a corded edge to which the locking members are clamped. Along one stringer are fastened the spring clip locking members 12 which engage the locking members 13 of the opposite stringer, and are controlled by the slider 14 having diverging channels.

Each locking member 13, illustrated in Fig. 9, is secured to the left hand stringer of Fig. 1 by means of compressible jaws 15. On the longitudinal edge of this locking member is provided a projection 16 having longitudinal flanges extending transversely in the manner shown to form a projection having a T-shaped cross-section. The inner surfaces of the flanges which are engaged by the opposite spring clip locking members 12 are flat, as shown, to prevent separation of the locking members under transverse strain. In order to retain the yieldable spring clips 12 in engagement with the projections 16 the flanges of each projection are recessed or notched on its opposite edges as illustrated at 17. The locking members on the opposite stringer comprise the yieldable clips 12 which are bent around the corded edge 11 as shown, passed through the tape 10, and are clamped onto said corded edge. Either side of a spring clip or both together may be regarded as a yieldable projection. The free ends 18 of the clips 12 are bent toward each other at substantially right angles so as to provide surfaces to engage the back of the flanges of the projection 16 and firmly retain the members 12 and 13 locked together so that they will not come apart under transverse stress. In order to firmly position the locking members 12 upon the corded edge of the stringer there are provided compressible bracing or jaw members 19 securely clamped to the corded edge above and below each locking member 12, as illustrated in Figs. 1, and 3 to 6, inclusive. Within the slider 14 and projecting from the reinforced portion between the diverging channels are located the cam surfaces 20 which are shaped to spread apart the spring clips 12 for engagement with the opposite locking members. A pull device 21 is preferably located adjacent the longitudinal and transverse center of the slider for moving it in either direction along the stringers.

The ends 18 of the spring clips 12 are bent to form a substantial right angle so that the locking members will not become unfastened under a severe transverse tension, but will hold firmly because the force will be substantially normal to the contact surfaces between the two locking members, that is, between the surface formed by one side of the bent ends of the spring clip and by the cooperating surface of the opposite locking member engaged by these bent ends. The ends of the spring clips may be bent slightly more than 90° if desired in order to more firmly retain the locking members engaged, but the angle should be only a small amount over 90° due to the fact that the bent ends of the spring clips move through an arc in engaging and disengaging the opposite locking member. If the projection portion of the spring clip locking members were shorter and the arc of travel of their bent ends greater, the bend at the ends could be slightly increased. The notched portions 16 retain the expansible ends of the spring clip locking members in position and prevent longitudinal movement between the stringers from unfastening the members.

Among the advantages of the invention may be mentioned the increased flexibility of the fastener which may be greater or less, according to the spacing between the locking members on the same stringer. The spacing between the locking members also controls the cost of the fastener since the use of a minimum number of locking members per unit length produces a less expensive fastener. Another advantage resides in the spring clip locking members being securely fastened to their opposite locking members and not capable of being disengaged under severe transverse strain, or, in fact, disengaged by a strain in any direction or by relative movement between the stringers. While not necessary, it is preferred that the ends of the spring clips be bent at a substantial right angle in order to better withstand transverse tension tending to separate the stringers, since if the bend were less than a right angle the force would be separated into components tending to expand the spring clip projection members and might result in the disengagement of the locking members. The additional securing members shown in Figs. 5 and 6 help retain the yieldable ends of the spring clip locking members in their correct position for proper engagement with the opposite locking members and prevent the yieldable ends from being moved out of place. A further advantage in this fastener resides in the locking members being made of either sheet or wire stock, which is adapted for fabrication by automatic machines. The cam surfaces within the slider should be sufficiently gradual to enable the locking members to move smoothly through the slider and should preferably be of about the shape illustrated.

I claim:

1. A slide type fastener comprising a pair of stringers having a plurality of pairs of opposed locking members, one member of each pair having flat flanges and the other member of each pair having resilient projections flexed toward each other with free ends bent substantially at right angles to grip opposite edges of said flanges, and means on said flanges to prevent longitudinal separation of said members.

2. A slide type fastener comprising a pair of flexible stringers, locking members on one stringer each having flanges extending longitudinally of said stringer, notches in the edges of said flanges, and locking members on the opposite stringer each having projections flexed toward each other to grip the notches in the flanges of the opposite locking members.

3. A slide type fastener comprising a pair of flexible stringers having a plurality of pairs of opposed locking members, one member of each pair consisting of a wire projection bent around the stringer, and separate wires clamped to the stringer on opposite sides of each such projection to prevent same from moving in either direction.

4. A slide type fastener comprising a pair of stringers having a plurality of pairs of opposed locking members, one member of each pair having a flanged projection with notches formed on its edges, and the other member of each pair having resilient clips flexed toward each other to grip said flanges and rest in said notches to prevent separation of said locking members when engaged.

5. A slide type fastener comprising a pair of stringers having a plurality of pairs of opposed locking members, one member of each pair having flanges with notches formed on opposite edges thereof, and the other member of each pair having a pair of resilient clips flexed toward each other with their free ends bent toward each other substantially at right angles to grip the notches in the opposite edges of said flanges to prevent separation of said locking members when engaged.

6. A slide type fastener comprising a pair of stringers having a plurality of pairs of opposed locking members, one member of each pair having flanges with notches formed on opposite edges thereof, and the other member of each pair having a pair of resilient clips flexed toward each other with their free ends bent toward each other substantially at right angles to grip the notches in the opposite edges of said flanges to prevent separation of said locking members when engaged, and a slider having a cam surface to flex said resilient clips against their normal tension and diverging channels to guide said opposed locking members into and out of engagement.

Signed at Meadville, in the county of Crawford, and State of Pennsylvania, this 2nd day of March, A. D. 1928.

GIDEON SUNDBACK.